June 9, 1964 R. P. SOLD 3,136,349
MACHINE FOR SLICING FOOD PRODUCTS
Filed July 31, 1962 4 Sheets-Sheet 1

INVENTOR.
ROBERT P. SOLD
BY
ATTORNEY

June 9, 1964 R. P. SOLD 3,136,349
MACHINE FOR SLICING FOOD PRODUCTS
Filed July 31, 1962 4 Sheets-Sheet 3
FIG. 3
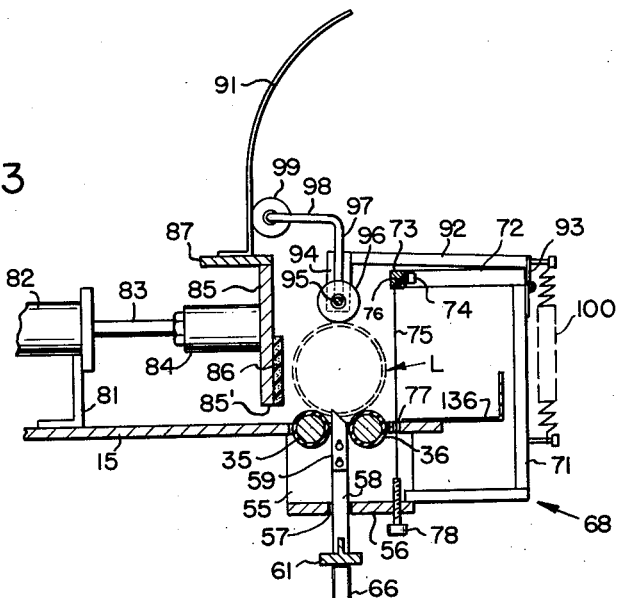
FIG. 5
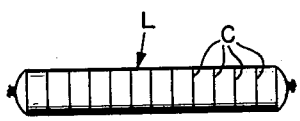
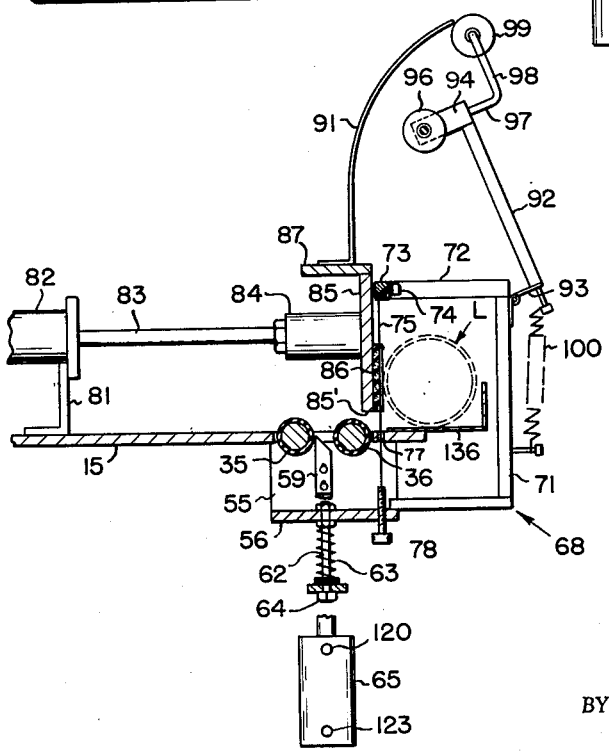
FIG. 4
INVENTOR.
ROBERT P. SOLD
BY
ATTORNEY United States Patent Office 3,136,349
Patented June 9, 1964

3,136,349
MACHINE FOR SLICING FOOD PRODUCTS
Robert Philip Sold, Spencerport, N.Y., assignor to Russer's, Inc., Rochester, N.Y., a corporation of New York
Filed July 31, 1962, Ser. No. 213,806
16 Claims. (Cl. 146—78)

This invention relates to a machine for slicing food products, and more particularly to a machine for slicing large links of encased sausage or other meat in encased loaf form.

Large sausages are made by stuffing sausage meat into a tubular case made of a tough, plastic material, or the prepared intestine of some animal; and tying the case by string or the like at various points along its length thus forming so-called "links." When interconnected links measure twelve inches or less in length, they may be severed into individual links and sold directly to the consumers. However, certain sausages, particularly liverwurst, are often manufactured in links which measure substantially more than twelve inches in length—at times measuring three or four feet in length. Links of the latter type, for practical purposes, are too long for sale directly to the consumer.

Heretofore it has been the practice to cut the excessively long links into individual chunks for sale. Because of the toughness of the protective plastic or gut casing surrounding the sausage, a manual cutting operation obviously requires the expenditure of a considerable amount of energy and man hours. Moreover, this operation tends to crush the link at the points where cuts are made, resulting in uneven and unsightly chunks of sausage unless the person cutting the link exercises particular care. Where the slicing of the links is attempted on a conventional slicing machine this still requires hand feeding, and is slow and tedious. In any event it is desirable for marketing purposes that the chunks be of uniform weight; but this is extremely difficult, if not impossible, to attain where the sausage or other loaf is sliced manually or by a known slicing machine.

An object of this invention is to provide a machine for automatically slicing a length of sausage into pieces of substantially uniform length and weight.

Another object of this invention is to provide a machine for this purpose which is of relatively simple and inexpensive construction.

A further object of this invention is to provide a machine for simultaneously trimming the rounded ends of a link of sausage, and slicing the remaining portion of the link into a plurality of pieces.

Other objects of the invention will be apparent hereinafter from the specification and from recital of the appended claims, particularly when read in conjunction with the accompanying drawings.

In the drawings:

FIG. 3 is an enlarged, fragmentary vertical sectional view taken along the line 3—3 in FIG. 1 and looking in the direction of the arrows, and showing the position of a sausage link before it is forced through stationary cutting wires on the machine;

FIG. 4 is a view similar to FIG. 3 but showing the sausage after it has been pushed through the cutting wires and severed into a plurality of pieces;

FIG. 5 is a diagrammatic view of a link of sausage as it would look immediately after being severed by the machine into a plurality of pieces.

Figure 1:
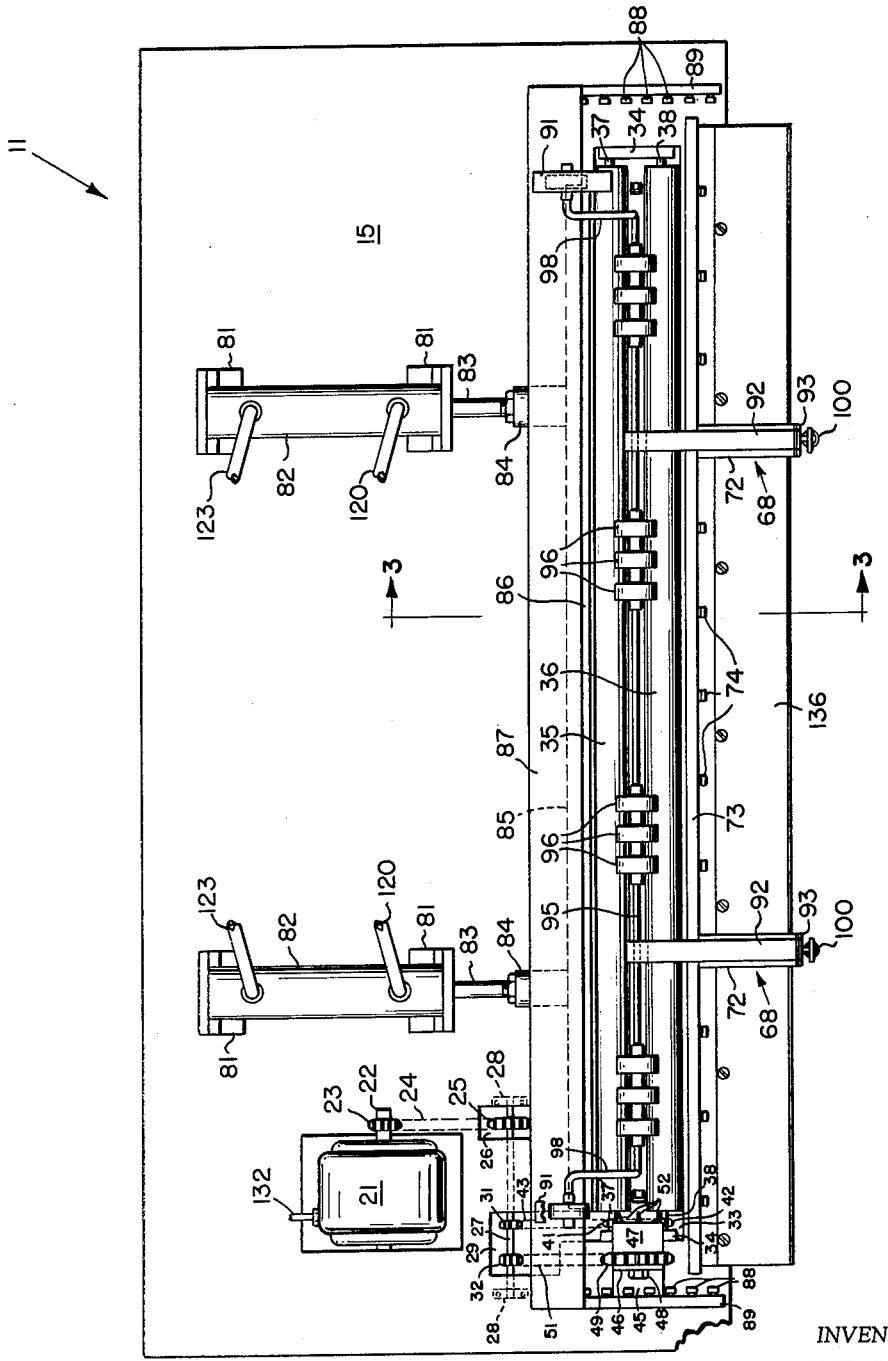
FIG. 1 is a plan view of a pneumatically operated machine made in accordance to one embodiment of this invention, part of the air supply lines being cut away for purposes of illustration.

Referring now to the drawings by numerals of reference, the machine 11 includes a frame having laterally spaced and vertically disposed end members or legs 12 (FIG. 2) that are adapted to support the machine on a shop floor or bench 13. Adjacent their lower ends the legs 12 of the frame are reinforced by a horizontally disposed angle iron 16 which extends between the legs just above floor 13. At their upper ends legs 12 support an elongate, rectangular, and horizontally disposed bed plate 15.

Mounted on the bed plate 15 adjacent one end thereof is a pneumatically operated motor 21 (FIG. 1) which has an output shaft 22 overlying the upper face of the bed plate. Secured to shaft 22 is a sprocket 23 which is connected by means of a chain 24 to a further sprocket 25 which rotates in an opening 26 in the bed plate 15. Sprocket 25 is secured to and drives a shaft 27 the opposite ends of which are rotatably mounted in bearings 28 secured to the under side of the bed plate 15. Also secured to shaft 27 to rotate therewith in a further opening 29 formed in the bed plate 15 are two further drive sprockets 31 and 32, respectively.

Mounted to rotate side by side in an elongate slot 33 which extends from one side of the machine to the other parallel to and adjacent the front edge of plate 15 are two, spaced, parallel, rubber-covered friction rollers 35 and 36 (FIGS. 1 and 3). These rollers are supported at opposite ends from plate 15 by shafts 37 and 38, which are rotatably journaled in journal boxes 34 secured to plate 15.

Figure 2:
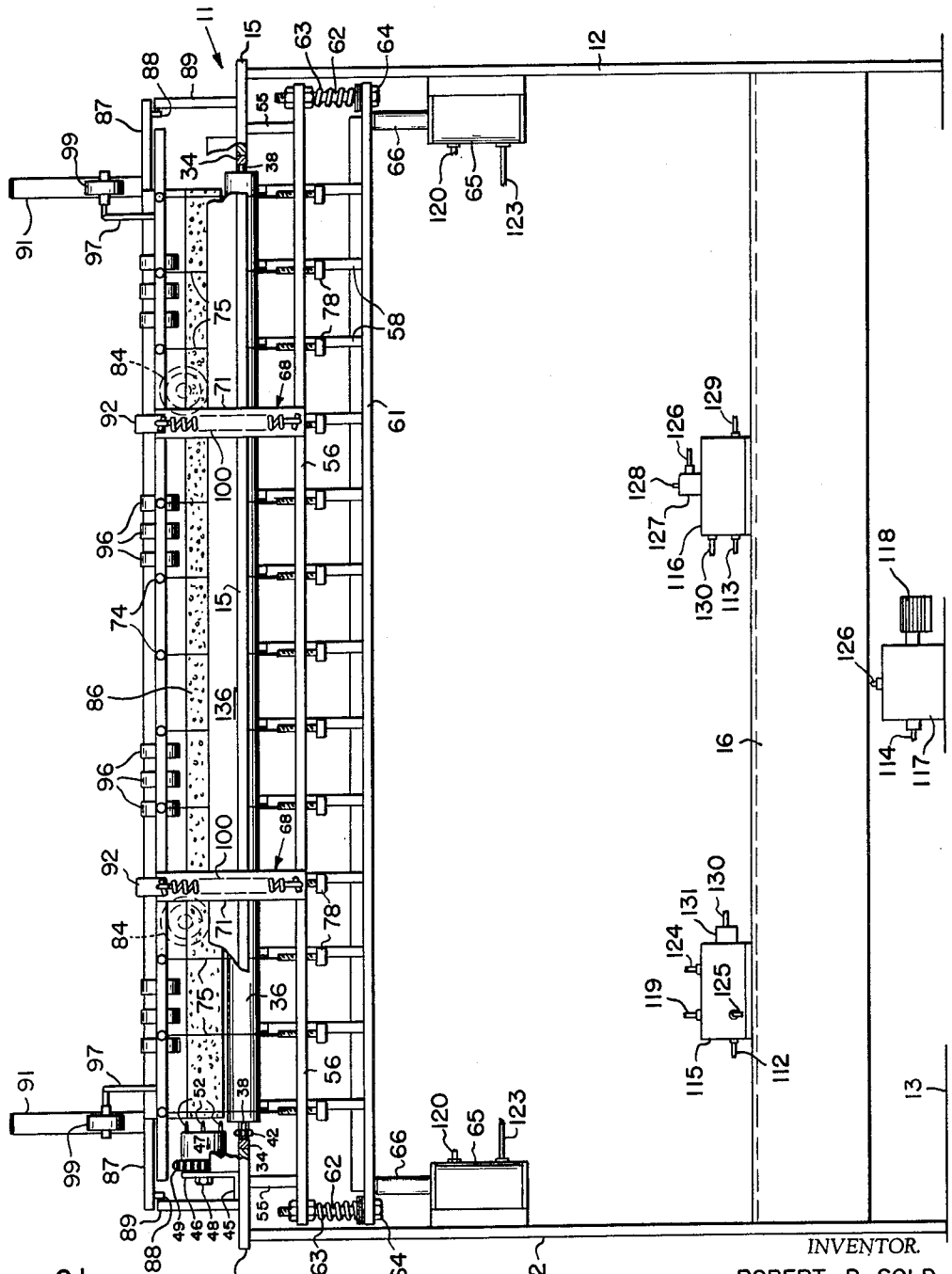
FIG. 2 is a front elevational view of this machine, parts being broken away.

Secured to the left hand shafts 37 and 38, as viewed in FIGS. 1 and 2 are sprockets 41 and 42, respectively (FIG. 1). The shafts 37 and 38 are adapted to be driven in unison, and in the same direction, by means of a chain 43 which passes through the opening 29 in plate 15 and connects both of the sprockets 41 and 42 to the drive sprocket 31.

Secured to the upper face of the plate 15 adjacent the left hand end of the slot 33 is a right angle bracket 45. Bracket 45 has a vertically disposed leg 46 upon which a rotatable drum 47 is mounted by a stud 48 to rotate above sprockets 41 and 42 about an axis which extends parallel to the rollers 35 and 36 and medially of the longitudinal edges of the slot 33. Drum 47 carries a sprocket 49 which is connected by a chain 51 to drive sprocket 32. Drum 47 has secured thereto a plurality of radially spaced pins 52 which project axially beyond drum 47, and which have free, pointed ends that overlie the left hand ends of the rollers 35 and 36.

Suspended from the plate 15 beneath slot 33 by two hanger plates 55 (FIG. 2) located adjacent opposite ends, respectively, of opening 33 is a horizontally disposed bearing plate 56 (FIGS. 2 to 4). Intermediate its ends bearing plate 56 is provided with a longitudinal row of equi-spaced, vertical slots 57 (FIGS. 3 and 4), thirteen in the instance shown, each of which is vertically aligned with the space between the two friction rollers 35 and 36. Vertically slidable in each of the slots 57 is a bar or rod 58 having secured to its upper end, by screws or the like, a pointed knife or blade 59. At their lower ends the rods or bars 58 are notched to accommodate the vertically disposed web of an inverted, generally T shaped beam 61 (FIGS. 2 to 4) to which the rods 58 are secured. The beam 61 is suspended in a horizontal position beneath the bearing plate 56 by means of bolts 62 (FIG. 2) that are secured to and which project downwardly from plate 56 adjacent opposite ends thereof respectively. Bolts 62 pass loosely through openings in opposite ends of beam 61; and compression springs 63, which surround the bolts and are disposed between bearing plate 56 and beam 61, constantly urge the latter vertically downwardly to its lowermost position where it engages and is stopped by the heads 64 of the bolts 62.

Secured to the inside face of each leg 12 of the machine frame beneath opposite ends, respectively, of the beam 61 are pneumatically operated air cylinders 65 (FIGS. 2 to 4). Each cylinder has a reciprocable piston rod 66 which extends vertically upwardly therefrom and is secured to the under side of beam 61 at one end thereof to reciprocate the beam 61 together with the rods 58 and the blades 59 carried thereby.

Two vertically disposed and generally C shaped brackets 68 are secured to the forward edge of bearing plate 56 at points positioned inwardly from opposite ends of the plate a distance equal to approximately one-third of its length. Secured to and projecting slightly downwardly from the inner end of the upper leg 72 of each bracket 68 is an elongate hanger plate 73 which is slightly greater in length than the friction rolls 35 or 36.

Secured to the side of the hanger plate 73 which faces the vertical legs 71 of the brackets 68 are a plurality of horizontally aligned and equi-spaced circular lugs 74. There are in the instance shown thirteen lugs in all, each of which lies in a vertical plane containing the vertical center line of one of the slots 57 in bearing plate 56. Secured to each lug 74 is one end of a cutting wire 75 which is guided downwardly through an inclined hole or slot 76 (FIGS. 3 and 4) in hanger 73, and passes vertically downwardly through a hole 77 (FIGS. 3 and 4) located in the plate 15 forwardly of the friction roller 36. At its lower end each wire 75 is secured to the upper, threaded end of a vertically disposed bolt 78 which is threaded into an opening in the bearing plate 56 at a point which is located slightly forwardly of and horizontally aligned with a respective slot 57 in plate 56. The bolts 78 permit adjusting the tension of cutting wires 75.

Secured by brackets 81 (FIGS. 1, 3 and 4) to the upper face of the plate 15 at points horizontally rearward of the friction rollers 35 and 36, and in nearly horizontal alignment with the two brackets 68 are two longitudinally spaced air cylinders 82. Projecting from the forward end of each cylinder 82 is a piston rod 83 which carries a head 84 that is adapted to be reciprocated normal to the axes of rotations of the friction rollers 35 and 36, and toward and away from the plurality of cutting wires 75 mounted adjacent the front of the machine. Welded or otherwise secured to the forward ends of the two heads 84 is a horizontally disposed pusher plate 85. Pusher plate 85 extends longitudinally of the machine parallel to the rollers 35 and 36 and for nearly the full length thereof. The lower edge 85' (FIGS. 3 and 4) of pusher plate 85 is disposed in a horizontal plane which lies slightly above the rollers 35 and 36; and a relatively thick, sponge rubber cushion 86 is secured to the forward face of the pusher plate 85 and is substantially coextensive with the lower half thereof.

Secured to and projecting rearwardly from the upper edge of the pusher plate 85 is an elongate, rectangular plate 87. Opposite ends of plate 87 are mounted to ride upon two horizontally disposed rows of roller bearings 88 that are rotatably mounted along the upper edges of two support plates 89 (FIGS. 1 and 2) which are secured to and project upwardly from the face of the plate 15 adjacent opposite ends thereof, respectively. Secured to the upper surface of platform 87 adjacent opposite ends thereof, respectively, are two camming elements 91. Each camming element 91 curves upwardly and away from plate 87 toward the front of the machine.

Each of two pivotal, rocker arms 92 is connected by a hinge 93 at one of its ends to the upper end of the vertically disposed leg 71 of one of the brackets 68 at the front of the machine. The arms 92 extend rearwardly over the top of the associated bracket leg 72; and at their rear ends have downwardly projecting portions 94 in which there is secured, intermediate its ends, an elongate shaft 95. For a substantial portion of its length shaft 95 extends parallel to the rollers 35 and 36. It has rotatably mounted thereon four equally spaced groups of rollers 96, there being three rollers in each group in the instance shown. Adjacent each end thereof shaft 95 is bent, as denoted at 97 and 98, upwardly and rearwardly as shown in FIGS. 3 and 4 and carries rollers 99 on its terminal ends which engage and roll upon the camming elements 91. The advancement of cams 91 against rollers 99 causes the rocker arms 92 to be pivoted from the position shown in FIG. 3 to the positions shown in FIG. 4. Each of two springs 100 are connected at one end to each arm 92 adjacent hinge 93, and at the opposite to a bracket leg 71 thereby to assist the camming action of the cam elements 91.

Figure 6:
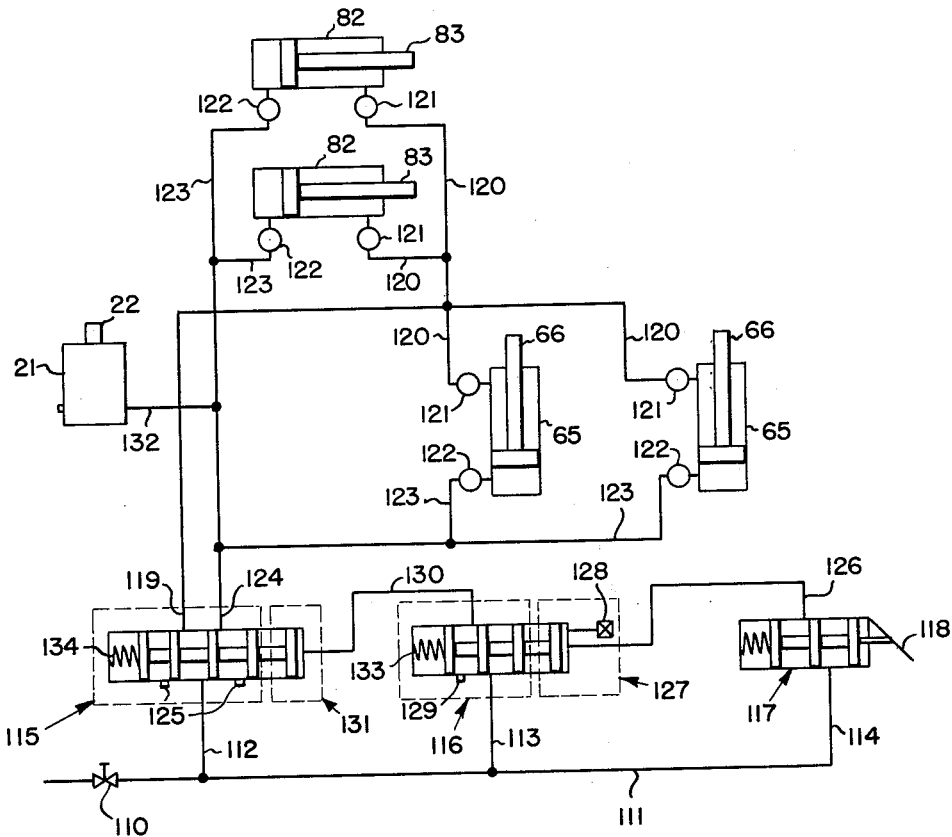
FIG. 6 is a diagrammatic view of the pneumatic circuit of the machine.

Referring now to FIG. 6 compressed air from a supply (not illustrated) is adapted to be admitted through a manually operated gate valve 110 or the like to the main air supply line 111. Air passes from the supply line 111 through pipes 112, 113, and 114 to, respectively, a conventional four-way pilot valve 115 mounted on angle iron 16 (FIG. 2), a conventional three-way pilot valve 116 also mounted on angle iron 16, and a conventional two-way, foot-operated control valve 117 (FIG. 2) disposed on the floor 13 beneath iron 16. In FIG. 6 the valves 115, 116 and 117 are shown in the positions which they assume when the knives and pusher plate are in withdrawn, inoperative positions, and the foot pedal 118 is in released position. In such instance air supply lines 113 and 114 is stopped at the valves 116 and 117, respectively; however, air from supply line 112 passes through valve 115 and pipes 119 and 120 and through conventional adjustable throttle valves 121 to the forward and upper ends, respectively, of the air cylinders 82 and 65 (FIGS. 1, 2 and 6). This holds the pistons on rods 66 and 83 (FIGS. 1, 2 and 6) in their lower and rear positions, respectively. Air, at this time, is free to exhaust through adjustable throttle valves 122, tubing 123, line 124 and the exhaust port 125 in valve 115 to the atmosphere.

When foot pedal 118 (FIGS. 2 and 6) is depressed by the operator, valve 117 is shifted so that air from lines 111 and 114 passes through valve 117 to line 126 leading to a conventional bleeder valve 127 which forms a part of the timed, three way pilot valve 116. The air entering bleeder valve 127 causes valve 116 to be shifted to the left in FIG. 6, but the valve 116 only remains in this position for the period of time required for the charge of air on top of the valve 116 to be bled off or exhausted by the bleeder valve 127 through its adjustable exhaust port 128. During the period of time in which valve 116 is so shifted, however, its exhaust port 129 is closed, and air from line 113 passes through this valve and line 130 to the actuator cylinder 131 of the four way pilot valve 115. This causes valve 115 to be shifted to the left in FIG. 6 so that air from line 112 now passes through the valve and lines 124 and 123 to the lower and rear ends, respectively, of the cylinders 65 and 82, as well as through line 132 (FIGS. 1 and 6) to the air operated motor 21. Motor 21 thus is rotated, and the pistons in the cylinders 65 and 82 move toward the upper and forward ends, respectively, of these cylinders, which ends at this time exhaust through the adjustable throttle valves 121, lines 120 and 119 and the exhaust port 125 in valve 115 to atmosphere. When valve 117 is released and the air has been exhausted from valve 116 by bleeder valve 127, valve 116 returns to the position illustrated in FIG. 6 under pressure of spring 133, thereby placing the actuating cylinder 131 of valve 115 on exhaust through port 129 of valve 116 so that valve 115 returns under pressure of a spring 134 (FIG. 6).

To operate the machine, valve 110 is opened so that the pneumatic elements assume the positions shown in FIG. 6. At this time the knives 59 are in their lower positions (FIG. 4) and the pusher plate 85 is in its retracted position rearwardly of the friction rollers 35 and 36 as shown for instance in FIG. 3. At this time also arms 92 are pivoted upwardly as shown in FIG. 4. A length of liverwurst L or the like (shown in phantom by broken lines in FIGS. 3 and 4) is then placed upon the friction rollers 35 and 36 (FIG. 3) and engaged with the pointed pins 52 on drum 47 (FIG. 1). The arms 92 are then lowered against the action of the tension springs 100 so that the rollers 96 carried by the arms engage the peripheral surface of the link L as shown in FIG. 3. Thereafter the foot pedal 118 is pressed down to shift valve 117 (FIG. 6) causing pilot valves 116 and 115 to be shifted also in the manner previously described. Motor shaft 22 is thereby caused to rotate; and by proper adjustment of the throttle valve 121, the pistons in the cylinders 65 and 82 are caused successively to move to the upper and forward ends, respectively, of their cylinders.

The rotating motor shaft 22 causes the link L to be rotated clockwise in FIGS. 3 and 4 by the friction rollers 35 and 36 and the pins 52 on drum 47. At this time, the upward movement of the pistons in cylinders 65 causes knives 59 to be elevated from the lower position indicated in FIG. 4 to the upper position shown in FIG. 3 so that they sever the skin or casing surrounding the rotating sausage link L at axially spaced points therealong as illustrated at C in FIG. 5. Thereafter the advancing pistons in cylinders 82 cause the cushioned pusher plate 85 to engage and push the link L through the plurality of vertically disposed cutting wires 75 so that the latter slice through the link at the points where its casing has been severed by the knives 59. As the link L is pushed forwardly then it is sliced into a plurality of cylindrically shaped pieces which are of equal length because of the equi-distant spacing of the knives 59 and of the equi-distant spacing of the wires 75. Since the link L is of substantially uniform diameter between its ends these slices are also of substantially equal weight as desired. The slices come to rest upon a right-angled platform 136 (FIG. 4) which is secured to and projects forwardly and upwardly from the front edge of the plate 15. The camming elements 91 carried by the advancing pusher plate 85 engage rollers 99 and cause these rollers to roll upwardly on the forward face of the camming elements from the positions shown in FIG. 3 to the positions shown in FIG. 4 thereby causing the arms 92 and the rollers 96 carried thereby to be moved clean of the now-sliced link L to the upper or inactive positions shown in FIG. 4.

When the charge of air has been exhausted by the bleeder valve 127, as previously described, the valves 116 and 115 are returned to the positions shown in FIG. 6, and compressed air is admitted to the upper ends of cylinders 65 while the lower ends thereof are exhausted to the atmosphere. The beam 61 and the knives 59, aided by the action of the compression springs 63 (FIG. 2), are thus returned to their lowermost positions (FIG. 4). At the same time, air under pressure is also admitted to the forward ends of cylinders 82 and exhausted from the rear ends thereof so that the pusher plate 85 is retracted rearwardly of the friction rollers 35 and 36 at least to the position illustrated in FIG. 3. The sliced link L of sausage (FIG. 4) may then be removed, including the rounded end of the link which may have stuck to the pins 52 of drum 47; and a new link L positioned in the machine for cutting. The foot pedal 118 is then again depressed, and the cycle is repeated.

Although cylinders 65 and 82 are simultaneously actuated by valve 115 to elevate and advance the knives 59 and pusher plate 85, respectively, the throttle valves 121 and 122 associated with these cylinders are adjusted so that the pistons in cylinders 82 advance very slowly compared to the rate at which the pistons in cylinders 65 are elevated, thereby permitting knives 59 to penetrate and sever the casing surrounding a rotating sausage link L before the link is engaged by the advancing pusher plate 85.

From the foregoing it will be noted that applicant has devised a machine which is extremely simple to operate, and which eliminates much of the time and effort heretofore expended in the cutting of long, bulky sausage links. Moreover, by employing the knives 59 which first sever the skin or casing before the link is forced through the wires 75, applicant's machine results in a far more even or uniform slicing of the sausage link than was heretofore possible when the links were sliced manually or by conventional machines.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for slicing an elongate food product enclosed in a tubular casing, comprising
   (a) a frame,
   (b) means on said frame for rotating the product about its longitudinal centerline,
   (c) a first plurality of longitudinally spaced cutting elements,
   (d) means for moving the first-named means and said elements relative to one another in a first direction transverse to said centerline to cause said elements to form perimetral cuts through said casing at longitudinally spaced points therealong as said product is rotated,
   (e) a second plurality of longitudinally spaced cutting elements,
   (f) and means for effecting relative movement between said first-named means and said second plurality of cutting elements also in a direction transverse of said centerline to cause said second plurality of cutting elements to cut transversely through said product, after the cutting of said casing, in registry with the cuts in said casing.

2. A machine as claimed in claim 1 wherein
   (a) said first-named means comprises a plurality of rollers rotatable about spaced, parallel axes and frictionally engageable with the peripheral surface of said food product to support and drive said product, and
   (b) a member rotatable with said rollers about an axis extending parallel to and spaced from the roller axes, and
   (c) a plurality of pins which project from said member and are to be embedded in one end of the food product when it is in engagement with said rollers.

3. A machine for slicing a food product enclosed in an elongate tubular casing, comprising
   (a) a frame,
   (b) rotatable drive means on said frame engageable with a product and operative upon being rotated to rotate said product about its longitudinal centerline,
   (c) a plurality of spaced cutting elements mounted on said frame,
   (d) means for moving said elements between an inactive position in which each of said elements is spaced from the outer peripheral surface of a product disposed in engagement with said drive means, and an operative position in which each of said elements has penetrated radially through the tubular casing surrounding said product at longitudinally spaced points therealong,
   (e) a movable member engageable with the product after its casing has been penetrated by said cutting elements and operative to disengage said product from said rotatable drive means, and (f) a further plurality of spaced cutting elements mounted on said machine in spaced relation to a rotating product engaged by said drive means, and (g) operative upon the disengagement of a product from said drive means to cut transversely through said product at said axially spaced points therealong.

4. A machine for slicing a food product enclosed in a tubular casing, comprising (a) a frame, (b) means engageable with a product to rotate it coaxially of its axial centerline in a first position in said machine, (c) a first group of spaced cutting elements, (d) means mounting said elements on said machine for movement between inoperative positions in which said elements are spaced from a rotating product disposed in said first position, and operative positions in which said elements penetrate and form circumferential cuts through the tubular casing surrounding said rotating product at axially spaced points along said casing, (e) a second group of spaced cutting elements mounted in relatively stationary positions, respectively, and (f) means for moving the food product through said second group to cause the cutting elements of said second group to cut transversely through the food product in the planes containing said circumferential cuts.

5. A machine for slicing a food product enclosed in a tubular casing, comprising (a) a frame, (b) a plurality of spaced, parallel rollers mounted in said frame to engage and hold a product for rotation about its axial centerline, (c) means for rotating at least one of said rollers, (d) said one roller being operative frictionally to engage the peripheral surface of a product held by said rollers and to transmit its rotation to said product, (e) a first plurality of spaced cutting elements mounted on said machine, (f) means for moving said elements into cutting engagement with the peripheral surface of a rotating product held by said rollers thereby to cut through the tubular casing surrounding said rotating product at axially spaced points therealong, (g) movable means mounted on said frame and engageable with a rotating product, after the cutting of its casing by said elements, to disengage said product from said rollers, and (h) a second plurality of spaced cutting elements mounted on said frame adjacent said rollers and engageable with a product to cut transversely therethrough at said axially spaced points therealong upon the disengagement of said product from said rollers.

6. A machine as claimed in claim 5 wherein (a) said first plurality of cutting elements comprising a series of pointed blades movable in response to the second-named means to penetrate a predetermined distance into the casing of a rotating product, and (b) said second plurality of cutting elements comprises a plurality of wires mounted on said machine and extending transverse to the axial centerline of a product disposed in engagement with said rollers.

7. A machine for slicing a food product enclosed in a tubular casing, comprising (a) a frame having thereon a horizontally disposed plate, (b) at least two spaced, parallel rollers mounted on said plate for rotation, respectively, about horizontal axes, (c) said rollers being adapted to engage and support a food product in a first position for rotation about its axial centerline, (d) drive means for rotating at least one of said rollers, said one roller being operative frictionally to transmit its rotation to a product disposed in said first position, (e) a row of horizontally spaced cutter elements mounted on said frame and extending parallel to said rollers, (f) means for reciprocating said row of cutter elements between an inoperative position in which they are spaced from a product rotating in said first position, and an operative position in which the elements project into the space between said rollers to engage and form axially spaced, circumferential cuts through the tubular casing surrounding a product when the latter is rotating in said first position, (g) means movable to disengage a product from said rollers after the formation of said cuts in its casing, and (h) a further row or horizontally spaced cutter elements projecting upwardly from said plate adjacent said rollers and operative upon the disengagement of a product from said rollers by said movable means to cut transversely through the product at the axially spaced points therealong defined by said cuts.

8. A machine as defined in claim 7 wherein (a) said drive means comprises a pneumatically operated motor connected to said one roller, (b) said means for reciprocating the first-named cutter elements comprises at least one air cylinder having a reciprocable piston rod operatively connected to said first-named cutter elements, (c) said movable means comprises a reciprocable pusher plate operative upon movement thereof in one direction to engage and push a product out of said first position, and (d) at least one further air cylinder having a reciprocable piston rod connected to said pusher plate, and (e) a compressed air system interconnecting said motor and said cylinders and including (f) a manually operable control valve for simultaneously operating said motor and causing the piston rods in said cylinders to move to one of their extreme positions.

9. A machine as claimed in claim 7 wherein (a) said movable means includes a reciprocable pusher plate mounted on said frame for movement transverse to the axial centerline of a product disposed in said first position, and operative during movement thereof to one of its extreme positions to engage and urge a product out of said first position thereby to disengage it from said rollers, and (b) a cam member is carried by said pusher-plate, and (c) at least one arm is mounted on said frame to pivot between an operative and an inoperative position, respectively, and (d) a shaft is carried by said arm, and (e) a plurality of roller members are rotatably mounted on said shaft, (f) certain of said roller members being adapted to overlie and roll upon a rotating product when said arm is in its operative position, and (g) certain other of said roller members being engageable by said cam member during movement of said pusher-plate to said one extreme position whereby said cam member is operative to move said arm to its inactive position.

10. A machine as claimed in claim 7 wherein (a) a drum is mounted on said bed to rotate about an axis which extends parallel to and is spaced between the axes of said rollers, and (b) said drum has a plurality of pins projecting axially beyond one end thereof to engage in one end of a product disposed in said first position, and (c) said drive means includes a motor connected to and operative to rotate in unison both said drum and said two rollers.

11. A machine for slicing a food product in an elongate casing, comprising
 (a) a frame,
 (b) means for supporting said product in said frame,
 (c) a first plurality of spaced cutting elements on said frame,
 (d) means for moving said cutting elements and said supporting means relative to one another thereby to cause said elements to cut completely around a product casing and part way into said product at longitudinally spaced points therealong,
 (e) a second plurality of spaced cutting elements on said frame, and
 (f) means for removing said product from said supporting means after the formation of said cuts around its casing,
 (g) said second plurality of cutting elements being operative, during the removal of said product from said supporting means, to slice completely through said product at longitudinally spaced points therealong registering with the cuts around its casing.

12. A machine for sliding a food product enclosed in an elongate casing, comprising
 (a) a frame,
 (b) means for supporting said product in a first position on said frame,
 (c) a plurality of longitudinally spaced cutting elements arranged on said frame,
 (d) first movable means operable when the product is in said first position to cause said cutting elements to sever the casing around the product at longitudinally spaced points therealong,
 (e) second movable means mounted on said frame and operable to shift said product from said first position to a second position, and
 (f) actuating means for said first and second movable means,
 (g) a further plurality of longitudinally spaced cutting elements mounted on said frame adjacent the first-named cutting elements and opeartive upon the movement of said product from said first to said second position to slice completely through said product at said longitudinally spaced points therealong,
 (h) said first-named means including drive means for rotating the product in said first position,
 (i) said first movable means comprising a reciprocable member for carrying said first-named plurality of cutting elements in unison toward and away from a product disposed in said first position,
 (j) said second movable means including a further reciprocable member operative upon movement thereof in one direction to engage and move a product from said first position to said second position, and
 (k) said actuating means comprising fluid pressure responsive means connected to said drive means and said reciprocable members, and
 (l) a manually operable valve for selectively controlling the operation of said fluid responsive means.

13. A machine as claimed in claim 12 wherein said fluid responsive means comprises
 (a) a pneumatically operated motor for actuating said drive means,
 (b) a plurality of of reciprocable pistons connected to said reciprocable members to reciprocate the latter, and
 (c) a compressed air system interconnecting said motor, said pistons and said valve,
 (d) said valve being operative in one position to actuate said motor and to cause said pistons to advance and move the first-named member and the cutting elements thereon at a predetermined rate toward a rotating product disposed in said first position, and to move said further member in said one direction at a rate less than said predetermined rate so that said first-named cutting elements sever the casing surrounding said product before the latter is shifted from said first to said second position, and
 (e) said valve being operative when in another position to interrupt the operation of said motor and to cause said pistons to retract.

14. A machine for sliding a food product comprising
 (a) means for rotatably supporting the food product,
 (b) a first group of cutting elements spaced longitudinally of the food product,
 (c) means for moving the cutting elements of said first group together in a direction transverse to the axis of rotation of the food product and through a limited distance to make a plurality of peripheral cuts of limited depth peripherally around the food product at longitudinally spaced points therealong as the food product is rotated,
 (d) a second group of cuting elements mounted in relatively stationary positions and in spaced relation longitudinally of the food product, and
 (e) means for moving said supporting means to move the food product through said second group of cutting elements transversely of its axis of rotation to cause said second group of cutting elements to slice clear through the food product at said longitudinally spaced points therealong.

15. A machine as claimed in claim 14 wherein the means for moving the first group of cutting elements and the means for moving the food product through the second group of cutting elements are actuated simultaneously but at different speeds so that the cutting elements of said first group penetrate the food product and take their cuts before the second group of cutting elements take their cuts.

16. A machine as claimed in claim 14 in which
 (a) fluid pressure actuated means is connected to and is operative to actuate both the means for moving the first group of cutting elements and the means for moving said supporting means and
 (b) the last-named means includes throttle valves adjusted to control the speed of movement of said first cutting elements and said supporting means, respectively, so that said first group of cutting elements cut peripherally around said product before the latter is moved through said second group of cutting elements.

References Cited in the file of this patent
UNITED STATES PATENTS

| | | |
|---|---|---|
| 894,461 | Pullen | July 28, 1908 |
| 1,348,636 | Fretter | Aug. 3, 1920 |
| 1,900,298 | Morris | Mar. 7, 1933 |
| 2,692,629 | Gardner | Oct. 26, 1954 |
| 3,059,306 | Hamilton | Oct. 23, 1962 |